(12) United States Patent
Chen

(10) Patent No.: US 6,516,930 B2
(45) Date of Patent: Feb. 11, 2003

(54) RATCHET MECHANISM FOR TOOLS

(76) Inventor: Ching Chen, 1, Nong 2, Lane 741, Dong-Ping Rd., Tai-Ping City, Taichung Hsien (TW)

( * ) Notice: Subject to any disclaimer, the term of this patent is extended or adjusted under 35 U.S.C. 154(b) by 75 days.

(21) Appl. No.: 09/750,420

(22) Filed: Dec. 29, 2000

(65) Prior Publication Data

US 2002/0084163 A1 Jul. 4, 2002

(51) Int. Cl.⁷ .............................................. F16D 41/18
(52) U.S. Cl. ...................... 192/43.2; 81/63.1; 192/108
(58) Field of Search .............................. 192/43.1, 43.2, 192/108; 81/63.1, 62; 74/577 M, 462

(56) References Cited

U.S. PATENT DOCUMENTS

| | | | | |
|---|---|---|---|---|
| 5,647 A | * | 6/1848 | Semple | 74/462 |
| 2,978,081 A | * | 4/1961 | Lundin | 192/43.1 |
| 3,436,992 A | * | 4/1969 | Over et al. | 81/63.1 |
| 3,587,365 A | * | 6/1971 | De Gaston | 74/142 |
| 4,993,288 A | * | 2/1991 | Anderson et al. | 81/61 |
| 5,782,147 A | * | 7/1998 | Chaconas et al. | 192/43.1 |
| 6,148,695 A | * | 11/2000 | Hu | 81/63.1 |

* cited by examiner

Primary Examiner—Rodney H. Bonck

(57) ABSTRACT

A ratchet mechanism for tools includes a ring member having first bevel teeth and second bevel teeth respectively defined in an outer periphery of the ring member. The first bevel teeth and the second bevel teeth are separated by an annular groove defined in the outer periphery of the ring member. Two pawl members are connected by a spring and each pawl member has third bevel teeth and fourth bevel teeth so as to respectively engage with the first bevel teeth and the second bevel teeth.

1 Claim, 4 Drawing Sheets

RATCHET MECHANISM FOR TOOLS

FIELD OF THE INVENTION

The present invention relates to a ratchet mechanism including a ring member engaged with two pawl members. The contact area between the pawl members and the ring member is increased to bear larger torque.

BACKGROUND OF THE INVENTION

A conventional ratchet mechanism for ratchet tools is shown in FIG. 1 and generally includes a ring member 10 having a polygonal inner periphery 11 for engaging a bolt, nut or the like, and teeth 13 defined in an outer periphery of the ring member 10. Two pawl members 12 connected by a spring are used to engage with the teeth 13 of the ring member 10, and each pawl member 12 has a toothed inner periphery 130 which is engaged with the teeth 13. However, when the pawl members 12 are moved to engage the teeth 13, only two or three teeth of the pawl members 12 are actually engaged with the teeth 13 in the ring member 10. That is to say, the as 5 torque output is generated by the contact between the teeth 130 and the teeth 13. Because the few number of the teeth 13, 130 includes only a limited contact area, a high torque cannot be generated and the teeth 13, 130 could be broken. For the compact size is a basic requirement of the hand tools so that it is hard to increase parts composing the ratchet mechanism.

The present invention intends to provide a ratchet mechanism including a ring member engaged with two pawls. The ring member has a toothed annular toothed wedge-shaped outer periphery and the pawl members each have a recessed toothed inside which is engaged with the ring member so as to have a larger contact area.

SUMMARY OF THE INVENTION

In accordance with one aspect of the present invention, there is provided a ratchet mechanism for tools and comprising a ring member having an annular groove defined in an outer periphery thereof. First bevel teeth and second bevel teeth are respectively defined in the outer periphery of the ring member. The first bevel teeth and the second bevel teeth are separated by the groove. Two pawl members are connected by a spring and each pawl member has third bevel teeth and fourth bevel teeth. The third bevel teeth and the fourth bevel teeth are respectively engaged with the first bevel teeth and the second bevel teeth.

The primary object of the present invention is to provide a ratchet mechanism for tools wherein the contact area is larger than that of the conventional ratchet mechanism so as to output larger torque.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
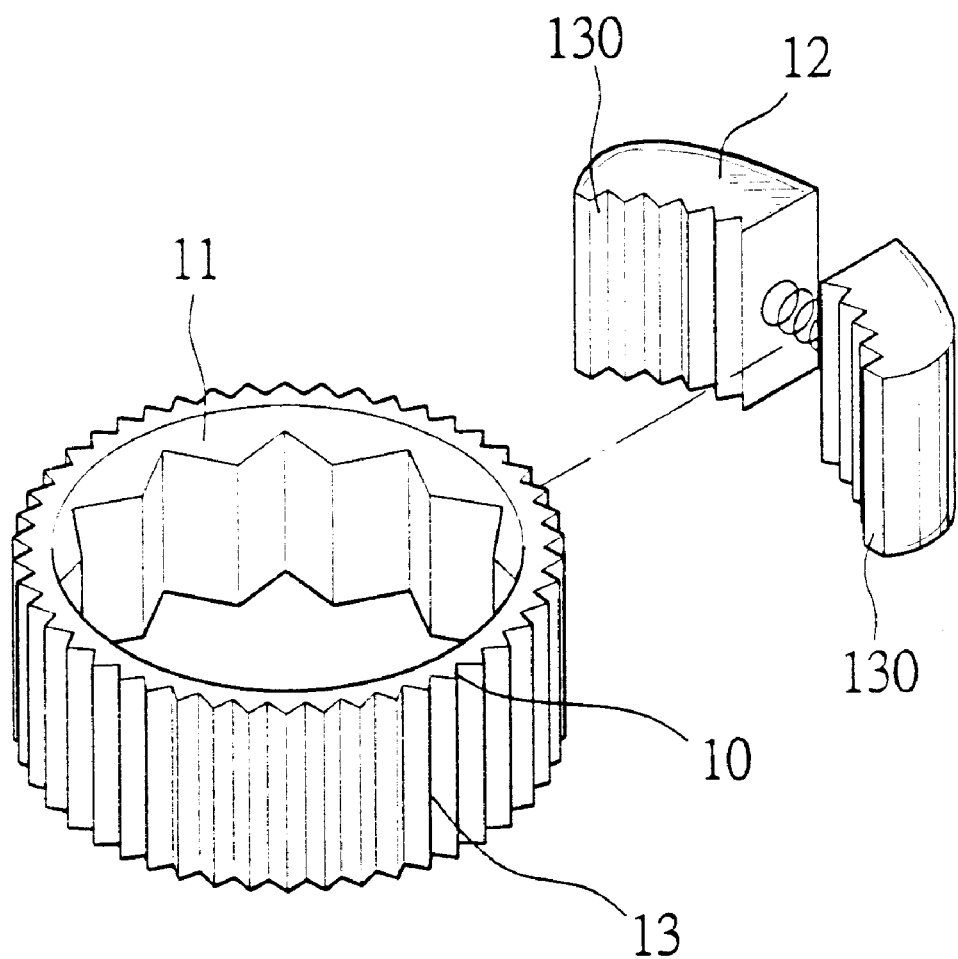
FIG. 1 is an exploded view to show a conventional ratchet mechanism.
Figure 2:
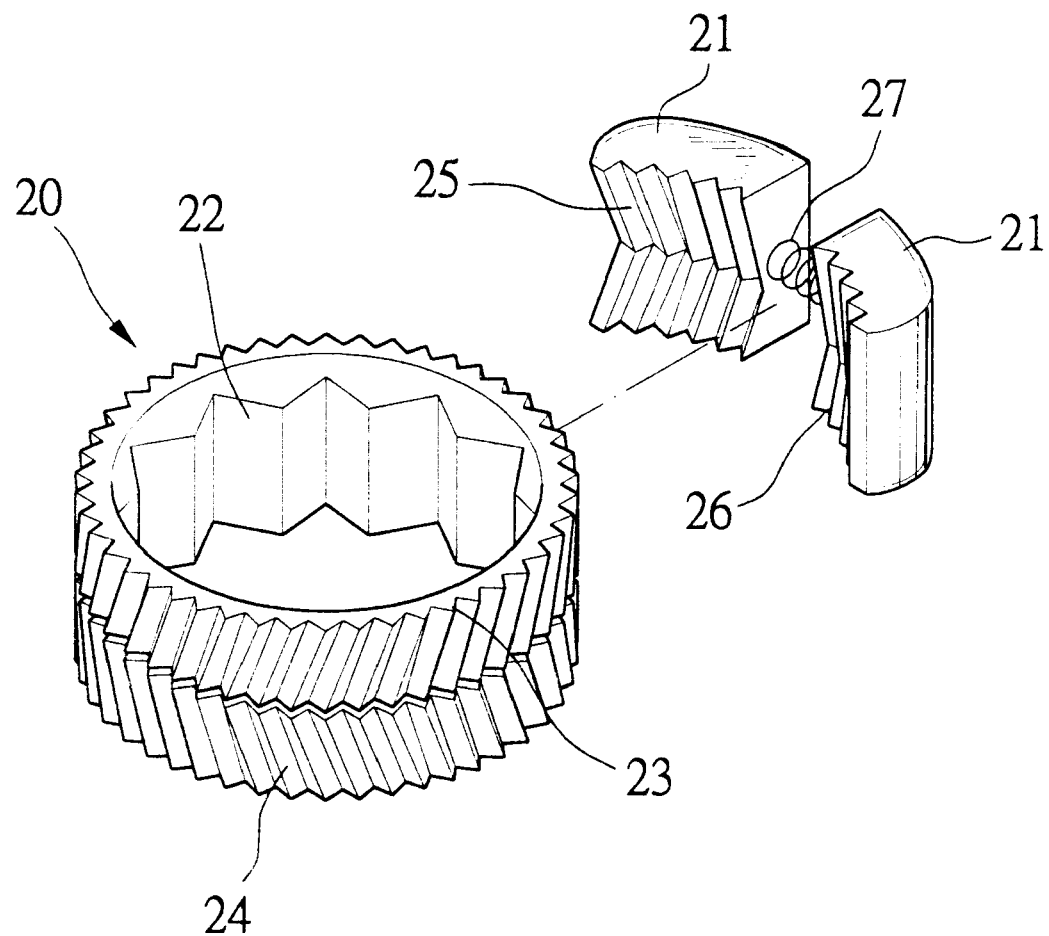
FIG. 2 is an exploded view to show a ratchet mechanism of the present invention.
Figure 3:
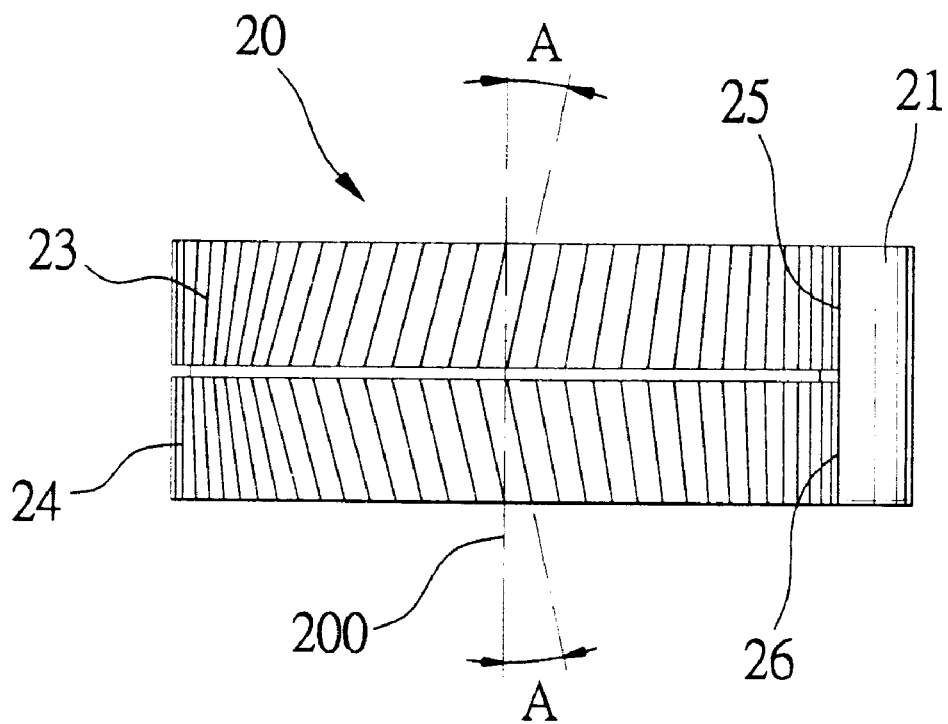
FIG. 3 is a cross sectional view to show an engagement between the ring member and the pawl members of the ratchet mechanism of the present invention.
Figure 4:
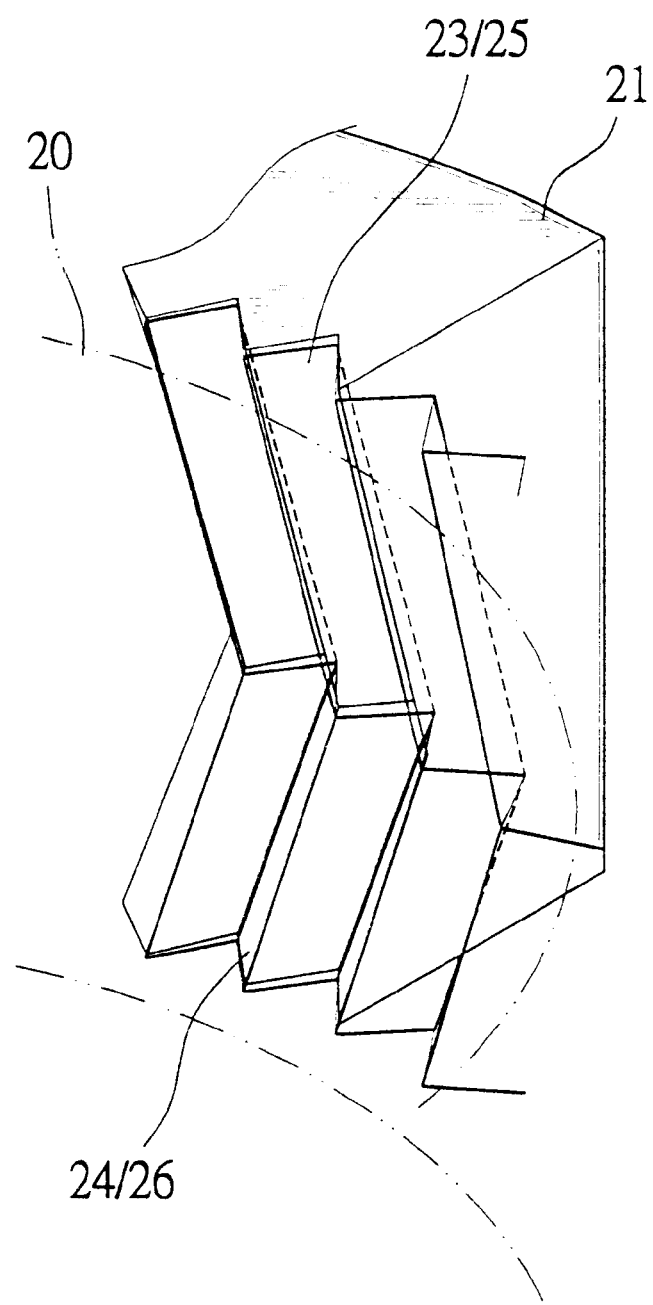
FIG. 4 is a perspective view to show the engagement between the ring member and the pawl members of the ratchet mechanism of the present invention.

Referring to FIGS. 2 to 4, the ratchet mechanism used in a ratchet tool of the present invention comprises a ring member 20 having a polygonal inner periphery 22 for engaging with an object such as a nut (not shown). An annular groove is defined in an outer periphery of the ring member 20. First bevel teeth 23 and second bevel teeth 24 are respectively defined in the outer periphery of the ring member 20, and the first bevel teeth 23 and the second bevel teeth 24 are separated by the groove.

As shown in FIG. 3, an angle "A" is respectively defined between each of the first teeth 23 and an axis 200 passing through a center of the ring member 20, 155 and each of the first teeth 23 and the axis 200. A same angle "A" is also defined between each of the second bevel teeth 24 and the axis 200 passing through the center of the ring member 20. The orientation of the first teeth 23 is different from that of the second teeth 24.

Two pawl members 21 are connected by a spring 27 and each pawl member 21 has third bevel teeth 25 and fourth bevel teeth 26 respectively defined in an inside thereof. The third bevel teeth 25 and the fourth bevel teeth 26 are respectively engaged with the first bevel teeth 23 and the second bevel teeth 24.

It is to be noted that the total length of the first and second bevel teeth 23, 24, and the third and fourth bevel teeth 25, 26 is longer than the total length of the teeth in the conventional ratchet mechanism so that the contact area between the ring member 20 and the pawl members 21 will be larger than the contact area between the ring member and the pawl members of the conventional ratchet mechanism. By this way, the ratchet mechanism may create a larger torque.

While we have shown and described various embodiments in accordance with the present invention, it should be clear to those skilled in the art that further embodiments may be made without departing from the scope and spirit of the present invention.

What is claimed is:

1. A ratchet mechanism for tools, comprising:

a ring member having a polygonal inner periphery and an annular groove defined in an outer periphery of said ring member, first bevel teeth and second bevel teeth respectively defined in said outer periphery of said ring member, said first bevel teeth and said second bevel teeth separated by said groove, an angle defined between each first bevel tooth and a line parallel to an axis passing through a center of said ring member, and the same angle defined between each second bevel tooth and the line parallel to the axis passing through the center of said ring member, and two pawl members connected by a spring and each pawl member having third bevel teeth and fourth bevel teeth, said third bevel teeth and said fourth bevel teeth respectively engaged with said first bevel teeth and said second bevel teeth.

* * * * *